UNITED STATES PATENT OFFICE 2,412,707

PROCESS FOR CAROTENE EXTRACTION

Harold M. Barnett, Long Beach, Calif.

No Drawing. Application June 7, 1943,
Serial No. 489,990

8 Claims. (Cl. 260—666)

This invention relates to the preparation of carotene in oil in concentrated form from vegetable materials.

The object of the invention is to provide a process for recovering a concentrated solution of carotene in oil from vegetable sources. Another object is to provide a process for making crystalline carotene.

I have discovered that the carotene content of thoroughly pulped fresh vegetable such as carrots may be almost completely removed by a suitable water elutriation process, and, when the process is carried out with a minimum amount of water, followed by subsequent coagulation of the carotene to form a water-dispersed coagulum having as much as 50 to 200 or more times the original concentration in the carrots, the carotene may be obtained in oil solution by direct extraction of the moist coagulum with hot vegetable oil.

My process will be illustrated by the preparation of carotene from carrots, although the process is applicable to other vegetable materials having carotene content such as tomatoes, alfalfa, sweet potatoes, etc.

The fresh carrots are reduced to a pulp by any suitable mechanical means, such as by passing them through a hammer-mill preferably without added water or other liquid. It is important that the structure be well broken down so that the carotene particles are released from the fiber and other materials. The semi-liquid mass or pulp is distributed in a thin layer on a moving foraminous belt such as a screen belt, and jets of water are forced against the pulp on the belt. The carotene and carotene-containing particles are insoluble in water, and are small enough—some being of colloidal dimensions—to be carried through the screen openings by the water. The action of the jets is to physically disentangle the carotene particles from the fiber and carry them through the screen, with avoidance of formation of a mat of fibers on the screen which would act as a filter and hold back or entrap the carotene particles. I have found that a screen of about 40 mesh is satisfactory for carrots, but the screen opening may be varied for different pulps. The minimum amount of water is used which will separate out substantially all of the carotene particles. A moving belt has been found advantageous to keep the amount of water to a minimum, but obviously other means may be used than those described here for illustration. When a belt is used, I find it desirable to press out the water from the pulp remaining on the belt using a roller for this purpose. The amount of water to be used varies with different vegetables and with different lots having varying qualities and textures. I have actually used up to 25 gallons of water to 100 pounds of carrot pulp. The carotene in the water emulsion from this elutriation or extraction process is then coagulated by heating the liquid with or without a coagulant, or by means of added coagulant such as hydrochloric acid. When the carotene is to be subsequently transformed from the water-base coagulum to an oil solution, I prefer to add an inert filter-aid material such as diatomaceous silica powder either before or after the water-base coagulum is formed, or it may be added at both stages.

The coagulum containing a small amount of diatomaceous silica filter aid is separated from much of the water by decantation. The remainder of the liquid may be removed by filtration. Because of the slimy character of the coagulum, even when filter-aid powder has been added, the wet mass may be transferred to filter bags, allowed to drain, and then pressed to remove as much of the water as desired. The amount of filter-aid is chosen to produce a filterable mixture without unnecessarily diluting the carotene content of the cake.

The moist coagulum containing filter-aid as previously described, containing a high concentration of carotene and a small amount of water, may also be treated or extracted with a hot edible oil such as cottonseed oil, to produce an oil solution of carotene. The temperature is maintained at 100 to 150° C. Excess temperature and too long a time are to be avoided because of the production of a scorched flavor which is undesirable for uses in food. The oil is removed from the extracted dry solids by filtration or centrifuging. If the residue contains much carotene, it may be again extracted with fresh oil, or the residue containing some carotene may be used for the fortification of feeds.

The carotene extraction from the moist filter cake is facilitated by forming the cake into ribbons or small rods (⅛ to ¼ inch in diameter) or pellets, by extrusion of the somewhat plastic mass through a suitable die. By using counter-current extraction by the hot oil, I have been able to get a high carotene concentration, for example, in one case as high as 1.5 percent carotene, equivalent to 11,325,000 units of vitamin A per pound. When the oil solution of this concentration is cooled, as much as one-fourth of the carotene is deposited in crystal form, which can be separated out by decanting or filtration, washed free from oil, thus recovering the carotene as a crystalline product.

By avoiding the drying of the carrots in the initial step of the concentration, or of drying the concentrate, and using the method of extracting directly into the oil, I greatly decrease the cost of getting the carotene from vegetable sources.

The carotene oil concentrate is suitable for enrichment of various foods and pharmaceuticals, or it may be used directly as a source of vitamin A.

I claim:

1. The process of extracting carotene from solid moist fresh vegetable carotene concentrate comprising heating the concentrate with edible oil to vaporize water and simultaneously extract the carotene in the oil, and removing the undissolved residue.

2. The process of recovering carotene comprising pulping a carotene-containing fresh vegetable, elutriating with water to separate the carotene particles from the fibrous material, forming a solid coagulum of the carotene-containing particles, separating the coagulum from excess water, heating the coagulum with edible oil to vaporize the water and simultaneously dissolve out the carotene, and separating the oil from the solid residue.

3. The process of recovering carotene comprising pulping a carotene-containing fresh vegetable, elutriating with water to separate the carotene particles from the fibrous material, adding a filter-aid powder, forming a solid coagulum of the carotene particles mixed with filter-aid, separating the coagulum and filter-aid from the excess water, heating the coagulum and filter-aid mixture with edible oil to vaporize the water and simultaneously dissolve out the carotene, and separating the oil from the solid residue.

4. The process of recovering carotene comprising pulping a carotene-containing fresh vegetable, elutriating with water to separate the carotene particles from the fibrous material, forming a moist solid coagulum containing the carotene, and extracting the carotene from the coagulum by means of hot edible oil.

5. The process of recovering carotene comprising pulping a carotene-containing fresh vegetable, elutriating with water to separate the carotene-containing particles from the fibrous material, adding a filter-aid powder to the water suspension, forming a moist solid coagulum containing the carotene and filter aid powder, forming said coagulum with filter-aid powder into small rods or pellets, and extracting said rods or pellets with hot edible oil to remove the carotene and vaporize the water.

6. The process of claim 5, in which the extraction step consists of moving said pellets or rods counter-currently against a stream of hot oil.

7. The process of making pure crystalline carotene comprising treating a moist solid carotene concentrate with hot edible oil by counter-current flow until said oil is saturated with carotene, allowing the oil solution to cool, and collecting the separated crystals of carotene.

8. The process of extracting carotene from a moist fresh vegetable carotene concentrate comprising drying the concentrate to a solid, and extracting the solid concentrate with hot edible oil.

HAROLD M. BARNETT.